(12) United States Patent
Machida et al.

(10) Patent No.: US 9,541,774 B2
(45) Date of Patent: Jan. 10, 2017

(54) CONTROL DEVICE FOR VARIABLE FOCUS LENSES, CONTROL METHOD FOR VARIABLE FOCUS LENSES, AND ELECTRONIC GLASSES

(71) Applicant: Mitsui Chemicals, Inc., Tokyo (JP)

(72) Inventors: Satoko Machida, Ehime (JP); Kouji Sone, Ehime (JP)

(73) Assignee: Mitsui Chemicals, Inc., Tokyo (JP)

( * ) Notice: Subject to any disclaimer, the term of this patent is extended or adjusted under 35 U.S.C. 154(b) by 203 days.

(21) Appl. No.: 14/118,403

(22) PCT Filed: Nov. 5, 2012

(86) PCT No.: PCT/JP2012/007079
§ 371 (c)(1),
(2) Date: Nov. 18, 2013

(87) PCT Pub. No.: WO2013/088630
PCT Pub. Date: Jun. 20, 2013

(65) Prior Publication Data
US 2014/0092327 A1 Apr. 3, 2014

(30) Foreign Application Priority Data
Dec. 16, 2011 (JP) ................. 2011-275839

(51) Int. Cl.
*G02F 1/13* (2006.01)
*G02C 7/08* (2006.01)
(Continued)

(52) U.S. Cl.
CPC ................. *G02C 7/083* (2013.01); *G02B 3/14* (2013.01); *G02F 1/13* (2013.01); *G02F 1/29* (2013.01);
(Continued)

(58) Field of Classification Search
CPC ................. G02C 7/083; G02C 2202/20; G02F 2001/294; G02F 1/29; G02B 3/14
See application file for complete search history.

(56) References Cited

U.S. PATENT DOCUMENTS

| 7,274,348 B2 | 9/2007 | Izumi et al. |
| 2002/0036614 A1 | 3/2002 | Nagai et al. |

(Continued)

FOREIGN PATENT DOCUMENTS

| CN | 1367399 | 9/2002 |
| CN | 101194198 | 6/2008 |

(Continued)

OTHER PUBLICATIONS

International Search Report issued Jan. 29, 2013 in International (PCT) Application No. PCT/JP2012/007079.
(Continued)

*Primary Examiner* — Richard Kim
(74) *Attorney, Agent, or Firm* — Wenderoth, Lind & Ponack, L.L.P.

(57) ABSTRACT

A control device (4) controls a varifocal lens (2) having a first substrate (20), a second substrate (22) facing the first substrate (20), and a varifocal component (14) disposed between the first substrate (20) and the second substrate (22). When an off signal is inputted to the varifocal component (14), the control device (4) stops applying voltage to the varifocal component (14), then applies voltage for a specific length of time, and finally stops the voltage. This reduces the duration of hazing that occurs during the switching of voltage application to the varifocal component (14).

15 Claims, 9 Drawing Sheets

(51) Int. Cl.
*G02B 3/14* (2006.01)
*G02F 1/29* (2006.01)

(52) U.S. Cl.
CPC ..... *G02C 2202/20* (2013.01); *G02F 2001/294* (2013.01)

(56) References Cited

U.S. PATENT DOCUMENTS

| | | | |
|---|---|---|---|
| 2002/0047837 A1* | 4/2002 | Suyama | G02B 27/2271 345/204 |
| 2004/0027501 A1* | 2/2004 | Blum | G02B 27/017 349/13 |
| 2004/0160389 A1 | 8/2004 | Suyama et al. | |
| 2004/0164927 A1 | 8/2004 | Suyama et al. | |
| 2005/0174317 A1 | 8/2005 | Izumi et al. | |
| 2007/0146625 A1* | 6/2007 | Ooi | G02B 3/08 349/200 |
| 2007/0279365 A1* | 12/2007 | Kageyama | G02B 7/38 345/100 |
| 2009/0256977 A1 | 10/2009 | Haddock et al. | |
| 2010/0002190 A1 | 1/2010 | Clarke et al. | |
| 2011/0216257 A1 | 9/2011 | Galstian et al. | |
| 2012/0120335 A1 | 5/2012 | Galstian et al. | |
| 2012/0140128 A1* | 6/2012 | Lin | G02F 1/13471 349/13 |
| 2013/0077001 A1 | 3/2013 | Galstian et al. | |
| 2015/0055037 A1 | 2/2015 | Galstian et al. | |

FOREIGN PATENT DOCUMENTS

| | | |
|---|---|---|
| CN | 101676765 | 3/2010 |
| EP | 0 957 394 | 11/1999 |
| EP | 1 206 720 | 6/2010 |
| GB | 2 169 417 | 7/1986 |
| JP | 62-3223 | 1/1987 |
| JP | 62-10628 | 1/1987 |
| JP | 4-322214 | 11/1992 |
| JP | 5-34656 | 2/1993 |
| JP | 5-61023 | 3/1993 |
| JP | 9-243806 | 9/1997 |
| JP | 9-243960 | 9/1997 |
| JP | 9-258271 | 10/1997 |
| JP | 10-206899 | 8/1998 |
| JP | 11-142806 | 5/1999 |
| JP | 11-326871 | 11/1999 |
| JP | 11-352445 | 12/1999 |
| JP | 11-352453 | 12/1999 |
| JP | 2002-6287 | 1/2002 |
| JP | 2002-14324 | 1/2002 |
| JP | 2002-341311 | 11/2002 |
| JP | 2003-504665 | 2/2003 |
| JP | 2005-227406 | 8/2005 |
| JP | 2006-285047 | 10/2006 |
| JP | 2007-73088 | 3/2007 |
| JP | 2007-212623 | 8/2007 |
| JP | 2007-304461 | 11/2007 |
| JP | 2007-322620 | 12/2007 |
| JP | 2009-223301 | 10/2009 |
| JP | 2009-237211 | 10/2009 |
| JP | 2011-516927 | 5/2011 |
| JP | 4752763 | 6/2011 |
| JP | 2011-525251 | 9/2011 |
| WO | 01/02895 | 1/2001 |
| WO | 2005/081051 | 9/2005 |
| WO | 2006/078806 | 7/2006 |
| WO | 2009/126946 | 10/2009 |
| WO | 2009/153764 | 12/2009 |

OTHER PUBLICATIONS

Supplementary European Search Report issued May 6, 2015 in corresponding European Patent Application No. 12857658.4.
Office action issued Feb. 29, 2016 in Chinese Application No. 201280024236.8, with English translation.

* cited by examiner

| Fresh voltage | HCT[ms] |
|---|---|
| 2.5V | 1265 |
| 5.0V | 1460 |
| 7.5V | 820 |
| 9.0V | 695 |
| 10.0V | 715 |
| 12.5V | 1135 |
| 15.0V | 1230 |

| T[ms] | 0 | 20 | 50 | 100 | 150 | 200 | 250 |
|---|---|---|---|---|---|---|---|
| HCT [ms] | 1840 | 1650 | 1070 | 740 | 855 | 970 | 1060 |

| T[ms] | 300 | 400 | 500 | 600 | 700 | 800 |
|---|---|---|---|---|---|---|
| HCT [ms] | 1095 | 1440 | 1560 | 1610 | 1740 | 1815 |

FIG. 11

CONTROL DEVICE FOR VARIABLE FOCUS LENSES, CONTROL METHOD FOR VARIABLE FOCUS LENSES, AND ELECTRONIC GLASSES

TECHNICAL FIELD

The present invention relates to the control of a varifocal lens. More specifically, it relates to the control of a lens with which the refractive index can be varied by using a liquid crystal material or the like.

BACKGROUND ART

A semi-finished blank for use in a varifocal liquid crystal lens is made up of a lower substrate whose surface has a convex curve, an upper substrate having a rear face with a concave curve that is joined to the upper face of the lower substrate face to face, and so forth. A varifocal component that is made up of a liquid crystal material is disposed between the upper and lower substrates. The refractive index of the varifocal component can be varied by applying voltage to the liquid crystal material. This semi-finished blank undergoes some processing and then is used as a lens for bifocal eyeglasses, for example (Patent Literature 1).

CITATION LIST

Patent Literature

Patent Literature 1: Specification of US Laid-Open Patent Application 2009/256977

SUMMARY

Technical Problem

When switching from a state in which voltage is applied to a liquid crystal material to a state in which no voltage is applied, there is a short period in which the lens becomes hazy as the liquid crystal material transitions from a homeotropic state to a planar state. This leads to a decrease in commercial value when this lens is used for bifocal eyeglasses.

In view of this, the present disclosure provides a control device for a varifocal lens with which the decrease in the commercial value of the varifocal lens can be suppressed by reducing the duration of the hazing that occurs during switching of the voltage applied to the varifocal lens.

Solution to Problem

The varifocal lens control device disclosed herein is configured to control a varifocal lens having a first substrate, a second substrate facing the first substrate, and a varifocal component disposed between the first substrate and the second substrate. When the control device switches a state of the varifocal lens to a state of no voltage application, the control device stops applying voltage to the varifocal component, then applies voltage to the varifocal component for a specific length of time, and finally stops applying voltage to the varifocal component.

The varifocal component may be, for example, a cholesteric liquid crystal material that has undergone horizontal orientation.

Also, a Fresnel lens may be formed on the first substrate so as to correspond to the varifocal component, for example.

Also, the control device may apply voltage to the varifocal component for the specific length of time after 20 to 600 milliseconds have elapsed since the control device stops applying voltage to the varifocal component, for example.

Also, after the control device stops applying voltage to the varifocal component, the control device may apply voltage to the varifocal component for the specific length of time prior to when transmissivity of the varifocal component is at its lowest, for example.

Also, the voltage to the varifocal component may be a square wave, for example.

Also, after the control device stops applying voltage to the varifocal component, the control device may apply voltage to the varifocal component for the specific length of time, in which the voltage is a square wave and is applied for a single period of the square wave or one-half the period of the square wave, for example.

Furthermore, an amplitude of the voltage applied to the varifocal component may be substantially the same as an amplitude of voltage used to drive the control device controlling the varifocal component.

Advantageous Effects

With the varifocal lens control device disclosed herein, there is less of a decrease in the commercial value of a varifocal lens. Specifically, the duration of hazing that occurs during the switching of voltage application to the varifocal component can be reduced.

BRIEF DESCRIPTION OF DRAWINGS

FIG. 11 is a table of the time relation between the fresh voltage in the control pertaining to the Embodiment and the target transmissivity.

DESCRIPTION OF EMBODIMENTS

A controller 4 for controlling the varifocal lens 2 (an example of a varifocal lens) disclosed herein will now be described in detail through reference to the drawings.

Figure 1:
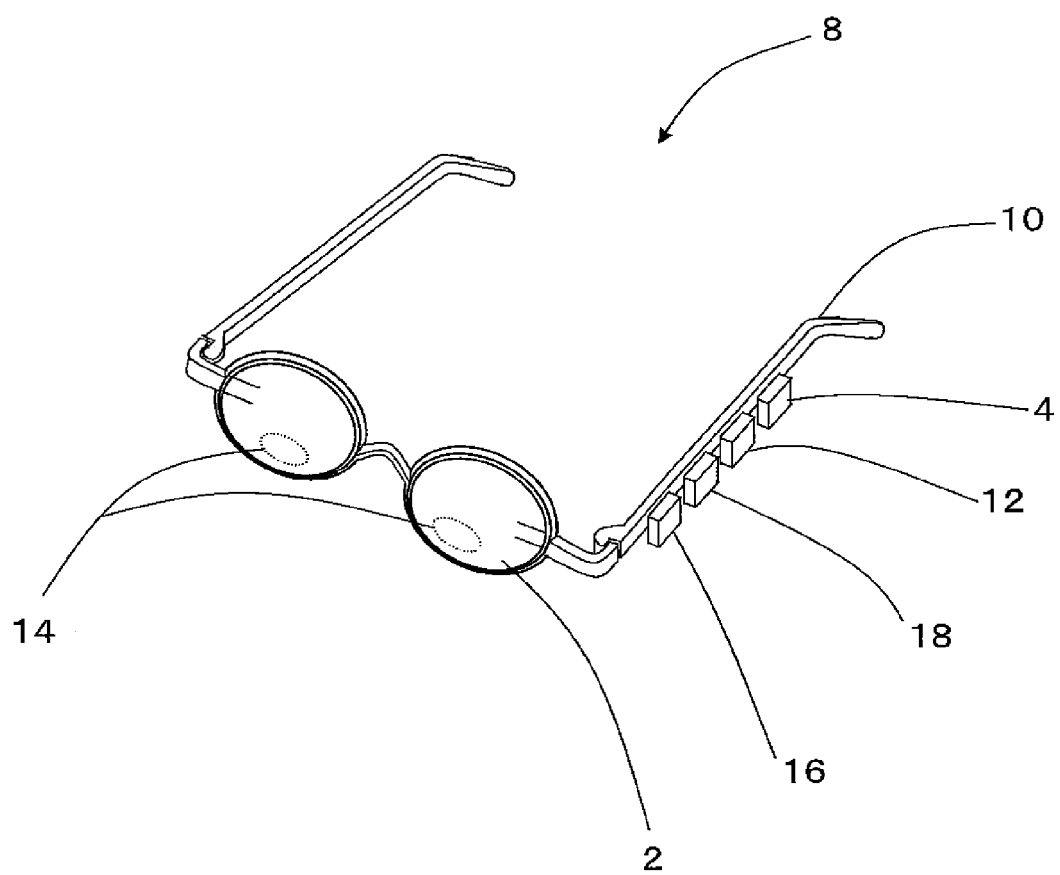
FIG. 1 is an oblique view of a pair of electronic eyeglasses pertaining to one Embodiment.

FIG. 1 is a simplified diagram of a pair of electronic eyeglasses 8 equipped with the varifocal lens 2 obtained by specific processing, such as surfacing and edging, from a varifocal lens-use semi-finished blank 6. The electronic eyeglasses 8 are constituted by an eyeglass frame 10 (an example of a frame), the varifocal lens 2, the controller 4, a sensor component 12, and so forth.

As shown in FIG. 1, a varifocal component 14 that has a liquid crystal material (such as a cholesteric material) is formed in a region that is shifted downward from the center of the varifocal lens 2. The refractive index of the varifocal lens 2 can be electrically varied with this varifocal component 14.

Figure 2A:
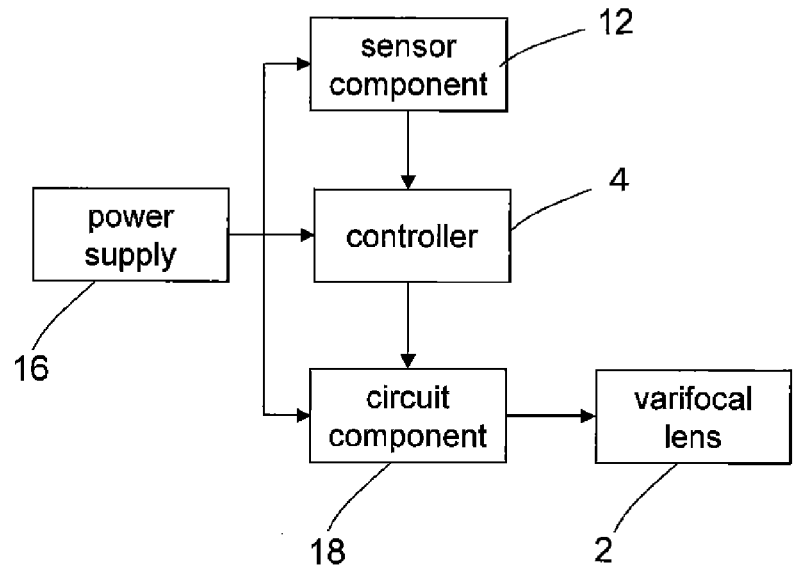
FIG. 2A is a control block diagram for the electronic eyeglasses pertaining to the Embodiment.

FIG. 2A is an electrical block diagram for the electronic eyeglasses 8. The eyeglass frame 10 is provided with a power supply 16, the sensor component 12, the controller 4 (an example of a control device), and a circuit component 18 (an example of a driver).

A rechargeable battery and a booster circuit (neither of which is shown) are incorporated into the power supply 16, and supply voltage to the sensor component 12, the controller 4, and the circuit component 18.

The sensor component 12 may be constituted by an angular velocity sensor, a tilt sensor, or the like. This sensor detects movement of a head of the user wearing the electronic eyeglasses 8, and outputs a signal to the controller 4. The sensor component 12 may also output a signal to the controller 4 by sensing some operation by the user (including manipulation by the user) such as contact with the user's hand.

As will be discussed in detail below, the controller 4 changes the refractive index of the varifocal component 14 by controlling the voltage applied to the varifocal component 14 according to the signal from the sensor component 12. The controller 4 is constituted by a memory or processor that executes various kinds of processing according to a program, for example. Into the circuit component 18 (an example of a driver) is incorporated a circuit for producing a lens drive waveform (not shown), etc., and voltage is applied to the varifocal component 14 according to a command signal from the controller 4, thereby driving the varifocal component 14.

Figure 2B:
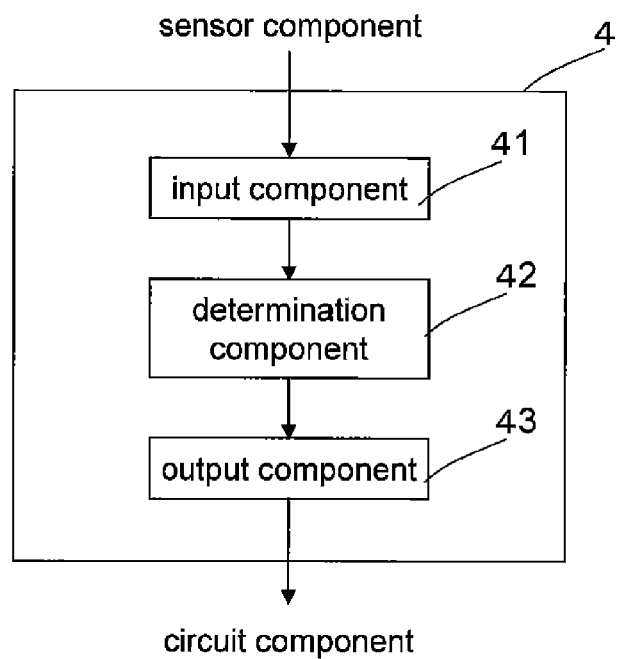
FIG. 2B is a block diagram of a controller for the electronic eyeglasses pertaining to the Embodiment.

The controller 4 functions as a control device. For example, as shown in FIG. 2B, the controller 4 includes an input component 41 for inputting the on or off signal from the sensor component 12, a determination component 42 for determining a switching signal from the sensor component 12, and an output component 43 for outputting to the circuit component 18 a command signal that is the determination result outputted from the determination component 42. The control device may include the controller 4 and the circuit component 18.

Figure 3A:
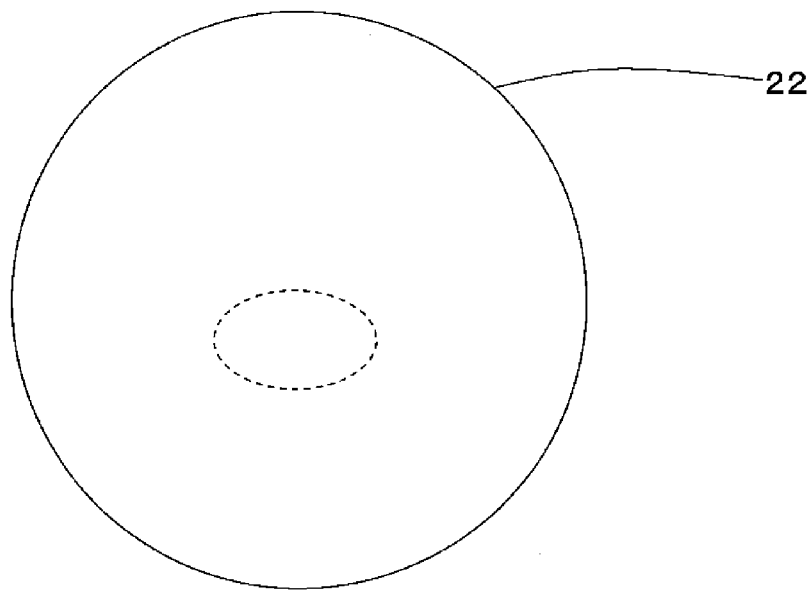
FIG. 3A is a front view of an upper substrate constituting a semi-finished blank of the electronic eyeglasses pertaining to the Embodiment.
Figure 3B:
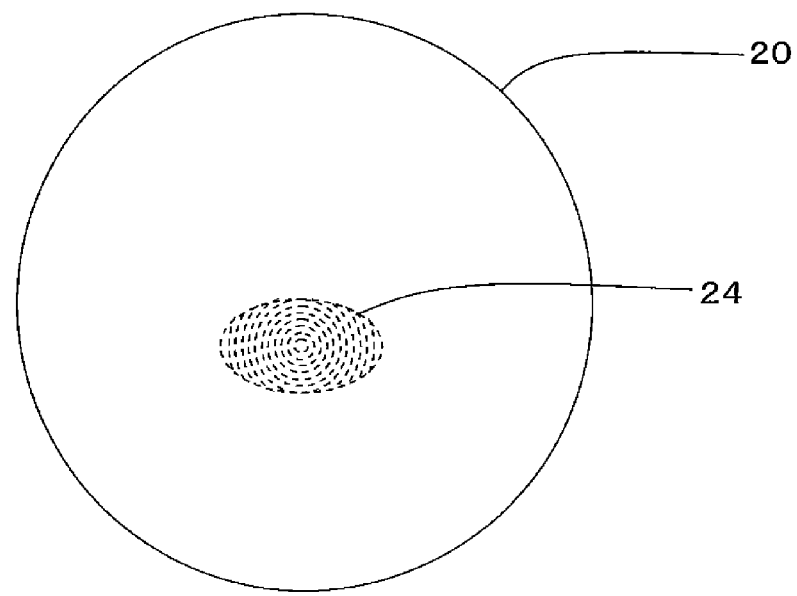
FIG. 3B is a front view of a lower substrate constituting a semi-finished blank of the electronic eyeglasses pertaining to the Embodiment.

The configuration of the varifocal component 14 will now be described. FIG. 3B is a front view of a lower substrate 20 (an example of a first substrate), and FIG. 3A is a front view of an upper substrate 22 (an example of a second substrate) that is joined to the lower substrate 20 face to face. A Fresnel lens 24 is formed in a partial region near the center of the lower substrate 20. The semi-finished blank 6 shown in FIG. 4 is constituted by forming a specific film between the lower substrate 20 and the upper substrate 22 and joining them.

Figure 4:
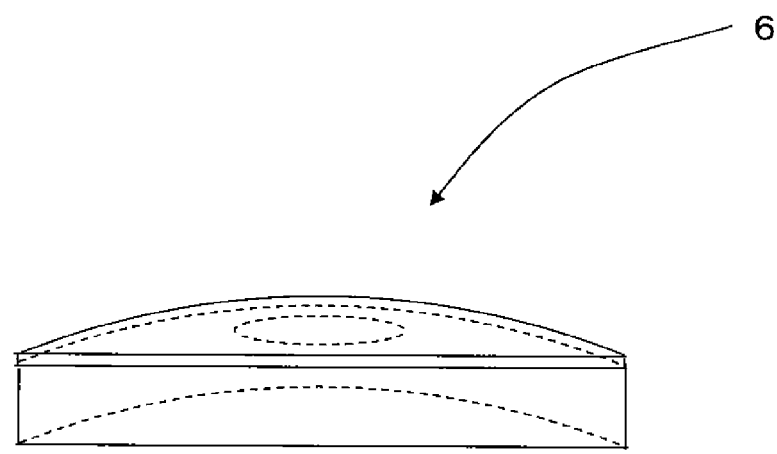
FIG. 4 is a side view of a semi-finished blank of the electronic eyeglasses in the Embodiment.
Figure 5:
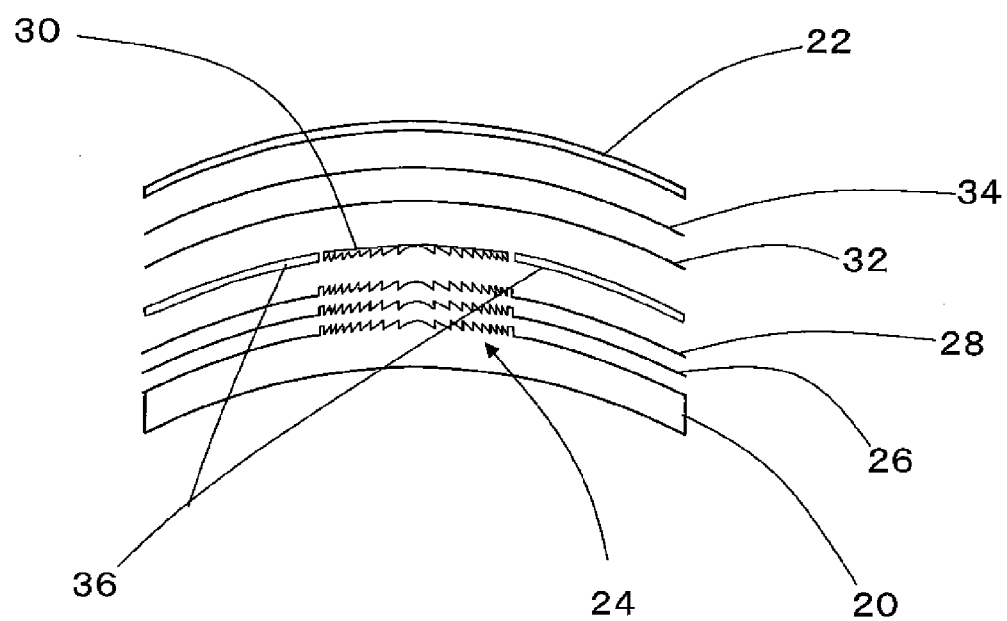
FIG. 5 is a simplified and exploded cross section of the semi-finished blank in FIG. 4.

FIG. 5 is a simplified and exploded cross section of the semi-finished blank 6 shown in FIG. 4 in the thickness direction (the direction parallel to the plane of the drawing) passing through the varifocal component 14. In a region facing the Fresnel lens 24 between the upper substrate 22 and the lower substrate 20, a first transparent conductive film 26, a first orientation film 28, a liquid crystal material 30, a second orientation film 32, and a second transparent conductive film 34 are formed in that order, from the lower substrate 20 side toward the upper substrate 22. In contrast, the region that does not face the Fresnel lens 24 is coated with a sealing agent 36 instead of the liquid crystal material 30. Specifically, the liquid crystal material 30 coats just the region where the Fresnel lens 24 is formed, and the sealing agent 36 coats the remaining region. Similarly, the orientation films may be formed in just the region where the Fresnel lens 24 is formed. Here, the insulating films (such as a silicon dioxide film) that are disposed between the transparent conductive films and the orientation films are not depicted for the reason of simplifying the description. The semi-finished blank 6 that has thus been formed then undergoes specific processing, and as a result, a varifocal lens 2 can be obtained.

When the electronic eyeglasses 8 constituted as above are used, for example, as bifocal eyeglasses in which the refractive index can be varied in two stages, the refractive index of the varifocal component 14 is lower when the user looks down than when the user looks up so that near visual acuity will be better (refractive index for myopia). Conversely, when the user is looking in the horizontal direction, the sensor component senses this, and the controller 4 increases the refractive index of the varifocal component 14 so that distant visual acuity will be better (refractive index for hyperopia).

Figure 6:
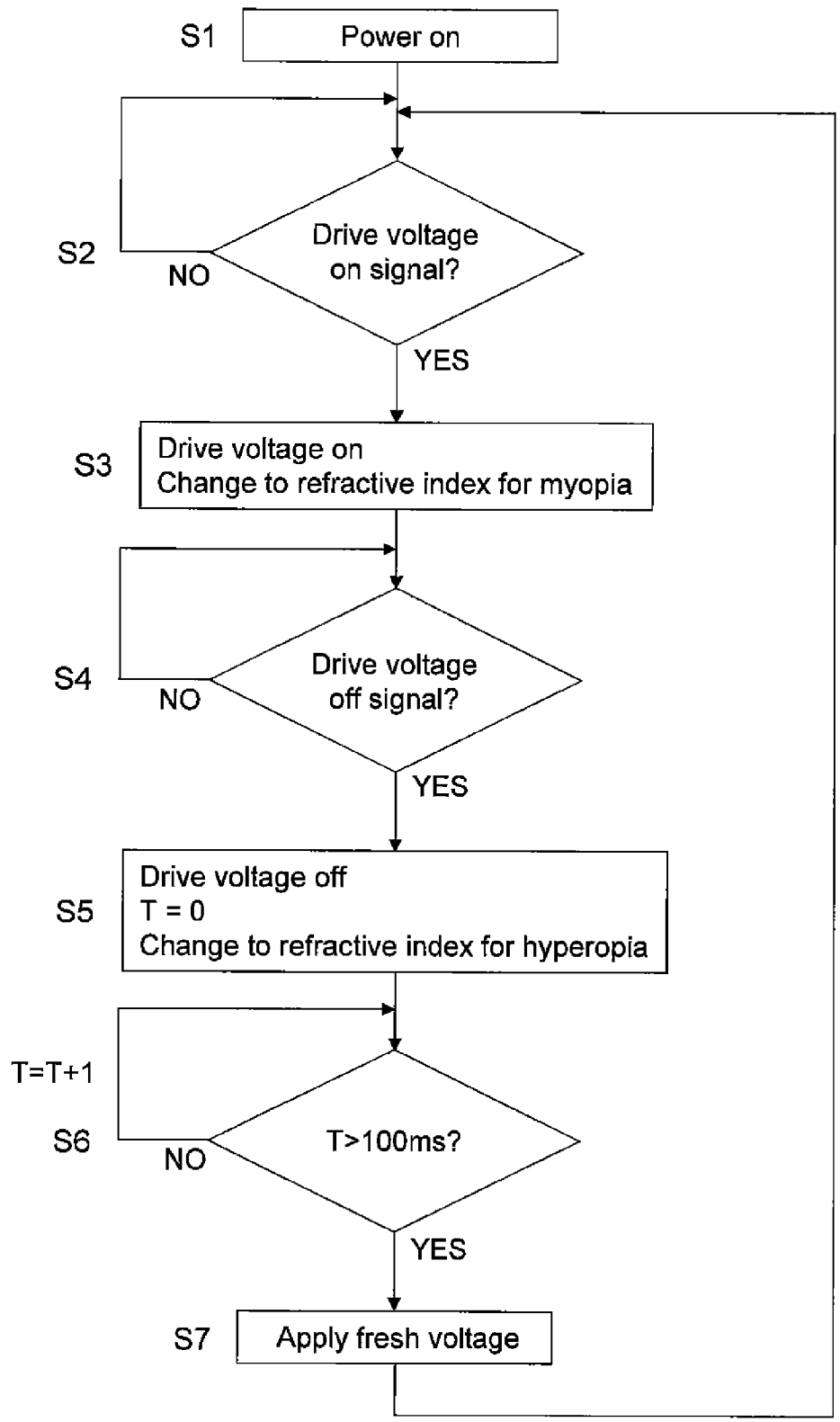
FIG. 6 is a flowchart show part of the control of the electronic eyeglasses pertaining to the Embodiment.

Next, the operation pertaining to the controller 4 that performs control of the varifocal component 14 electrically in this embodiment will be described in detail. In brief, the controller 4 halts the application of voltage to the varifocal component 14 when an off signal is inputted to the varifocal component 14, then applies voltage for a specific length of time (fresh voltage), and then halts the voltage again. FIG. 6 is a flowchart of the operation of the controller 4, and the operation of the controller 4 will be described through reference to this flowchart.

When the power is switched on to the electronic eyeglasses 8, voltage is supplied to the sensor component 12 (S1). In this state, the drive voltage to the varifocal component 14 is off, and the varifocal component 14 is set to a refractive index for hyperopia as its initial state. When the user wearing the electronic eyeglasses 8 then moves his head, and more specifically when the sensor component 12 senses a change in the vertical angle of the electronic eyeglasses 8, an on signal or off signal (an example of a specific switching signal) is outputted from the sensor component 12 to the controller 4 (S2). For example, when the user looks down to read a book, the sensor component 12 that senses the specific angle of the head outputs an on signal to the controller 4. Consequently, the circuit component 18 switches on the drive voltage to the varifocal component 14 (S3). At this point, the varifocal component 14 is set to a refractive index for myopia, which is suited to reading a book.

When the user finishes his reading and raises his head to a horizontal position, the sensor component 12 senses this angle and outputs an off signal to the controller 4 (S4), so that the drive voltage to the varifocal component 14 is switched off via the circuit component 18 (S5). To measure the time that the varifocal component 14 is in an off state here, a timer (not shown) connected to the controller 4 is reset to zero. When the drive voltage to the varifocal component 14 is off, the refractive index of the varifocal component 14 is set to the hyperopia refractive index.

The controller 4 uses the timer count to determine whether or not the off state of the varifocal component 14 has exceeded a specific time, such as 100 milliseconds (S6). If it is determined that the off state of the varifocal component 14 has exceeded this specific time, the controller 4 outputs to the circuit component 18 a signal for applying fresh voltage for just a short time to the varifocal component 14 (S7). After the fresh voltage has been applied for a specific length of time, application of voltage to the varifocal component 14 is halted, resulting in an off state.

Figure 7:
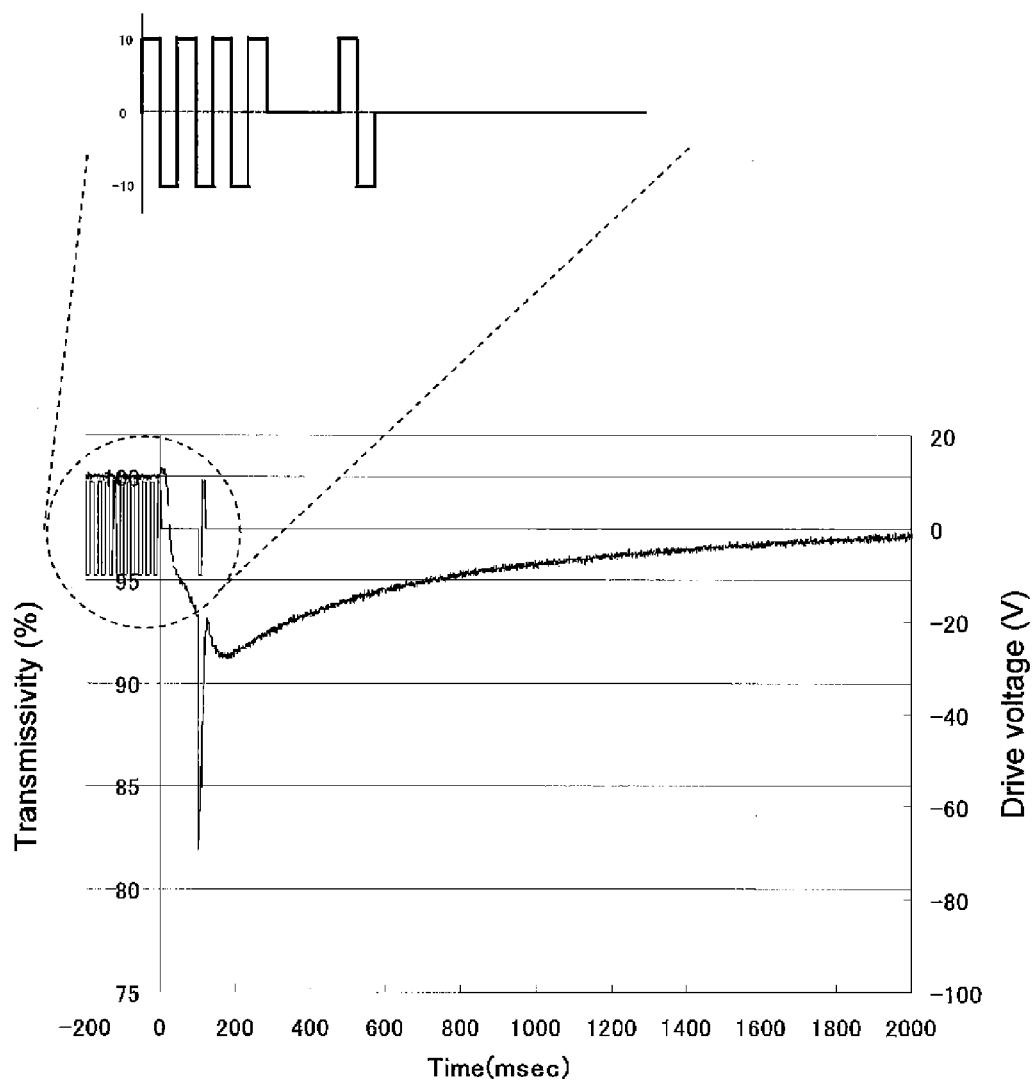
FIG. 7 is a time transition diagram of the transmissivity of electronic eyeglasses to which the control pertaining to Example 1 has been applied.

FIG. 7 shows the results of Example 1 in this embodiment. In this graph, the transmissivity of the varifocal component 14 is shown on the vertical axis, and the elapsed time on the horizontal axis. The fresh voltage used here is equivalent to one period of the pulse of the voltage used to drive the varifocal component 14 with a period (such as 50 Hz) and a voltage value (such as 10 V). The fresh voltage was applied 100 milliseconds after the drive voltage was shut off, at which the liquid crystal material 30 entered a focal conic state. For the sake of simplicity, we shall assume that the user does not notice any hazing that occurs when the drive voltage to the varifocal component 14 is switched off, as long as the transmissivity is at least 95%. As shown in this drawing, a transmissivity of 95% is reached approximately 740 milliseconds after the drive voltage to the varifocal component 14 is switched off (T=0). This is a pronounced difference as compared to FIG. 9, which illustrates a comparative example (discussed below).

Figure 8:
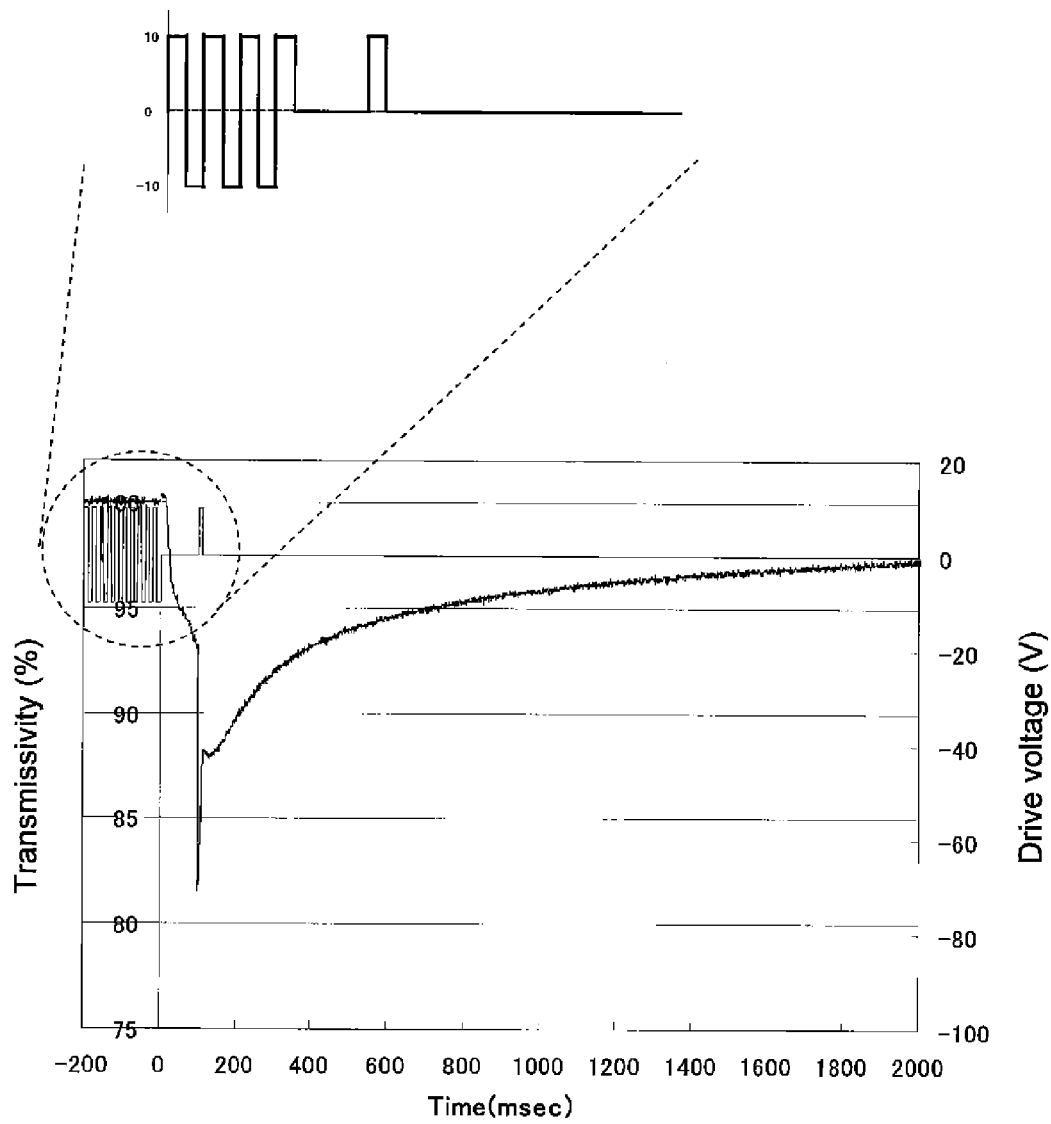
FIG. 8 is a time transition diagram of the transmissivity of electronic eyeglasses to which the control pertaining to Example 2 has been applied.

FIG. 8 is a graph in which the application of fresh voltage is changed, and the fresh voltage used in FIG. 7 is changed to one-half a period (such as approximately 25 Hz). Here again, it only takes about 730 milliseconds from the time the drive voltage goes off for the transmissivity of the varifocal component 14 to reach 95%. In the working examples shown in FIGS. 7 and 8, there is a sudden decrease in transmissivity immediately after the application of fresh voltage, but since this lasts such a short time, it cannot be discerned by a human.

Figures 9, 10:
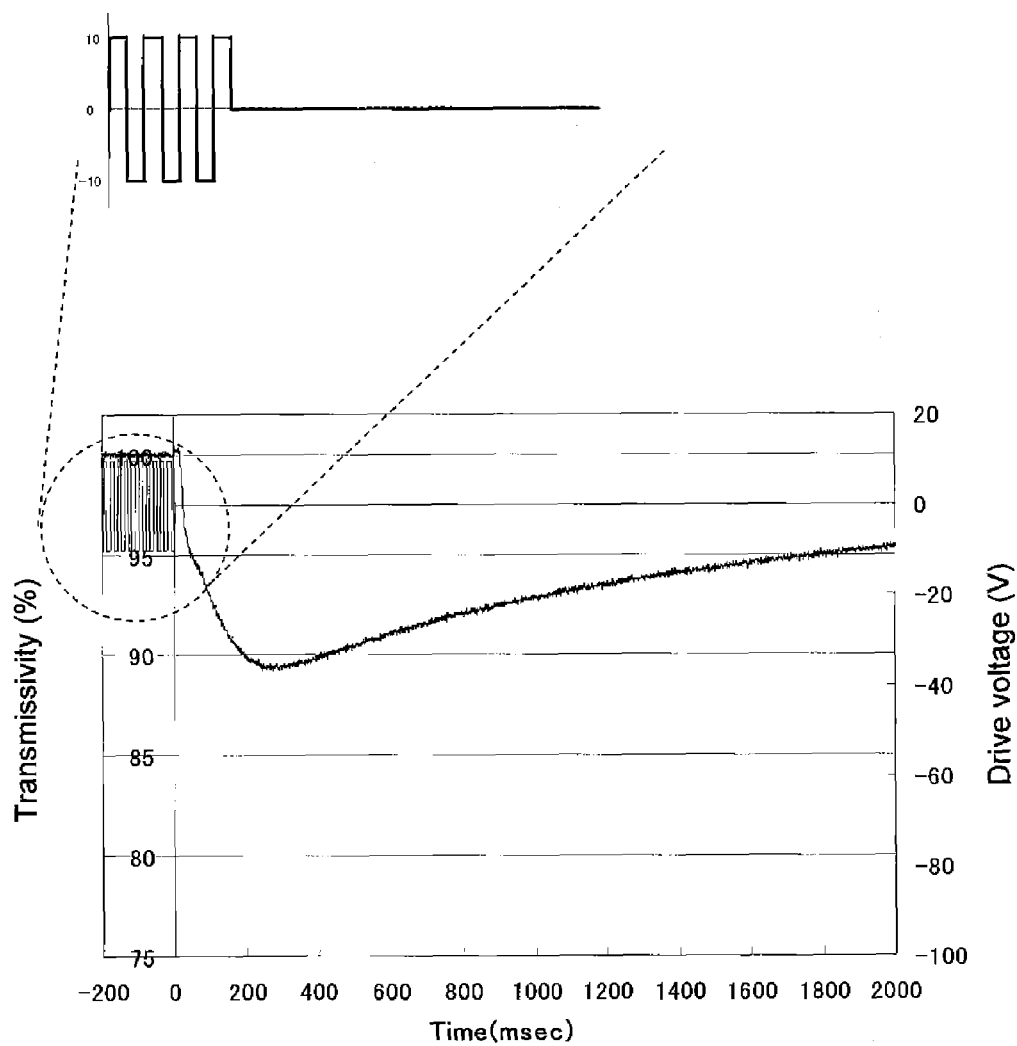
FIG. 9 is a graph for comparison showing the time transition of transmissivity of the electronic eyeglasses when the control pertaining to the above-mentioned working examples is not applied.
FIG. 10 is a table of HCT when the fresh voltage in the control pertaining to the Embodiment is varied.

FIG. 9 shows an example in which fresh voltage is not applied, as a comparative example to Examples 1 and 2. The liquid crystal material transitions to a focal conic state after the drive voltage to the varifocal component 14 is switched off, and the transmissivity of the varifocal component 14 decreases rapidly. After this, there is a gradual recovery, and the transmissivity reaches 95% about 1840 milliseconds after the drive voltage was switched off Next, we will discuss the transmissivity recovery time when the fresh voltage value was varied and when the timing at which the fresh voltage was applied was varied.

FIG. 10 is a table of the HCT (haze clearing time) when the fresh voltage value was varied. HCT here shows the time it takes for the transmissivity of the varifocal component 14 to recover to 95%. For the fresh voltage, one period of a pulse of voltage that is the same as the drive voltage to the varifocal component 14 (such as 50 Hz) was used. Also, the fresh voltage was applied to the varifocal component 14 approximately 100 milliseconds after the point when the drive voltage to the varifocal component 14 was halted (T=0). It can be seen from this table that the amplitude is preferably either the same as or similar to that of the drive voltage of the varifocal component 14. For instance, the HTC is preferably between approximately 20 and 600 milliseconds, and more preferably between approximately 50 and 300 milliseconds.

FIG. 11 shows the relation between HTC and the timing of fresh voltage application, that is, the time T from the point when the drive voltage to the varifocal component 14 is switched off until the fresh voltage is applied. As can be seen from FIG. 11, the timing of fresh voltage application is preferably 100 milliseconds after the varifocal component 14 has gone into its off state, or after a similar time has elapsed. Also, this timing of fresh voltage application is just prior to the time T at which transmissivity is lowest (approximately 230 milliseconds), as shown in FIG. 9 in which fresh voltage is not applied.

As discussed above, when the drive voltage to the varifocal component 14 is switched off, fresh voltage is applied for a specific length of time so that the transition to a planar state will be accomplished quickly. Thus, the period in which hazing occurs can be shortened. This keeps the user from noticing any flickering of the lens 2 of the electronic eyeglasses 8.

Other Embodiments

In the above embodiment, the sensor component 12 was an angular velocity sensor or a tilt sensor. Instead of using such sensor or in addition to using such sensor, the refractive index of the varifocal component 14 may be manually switched by the user.

Also, in the above embodiment, the varifocal component 14 was set to a hyperopia refractive index as the initial state of the electronic eyeglasses 8, but this is not the only option. The varifocal component 14 may instead be set to a myopia refractive index as the initial state.

Also, whether or not the liquid crystal material 30 is in a focal conic state may be determined from whether or not the transmissivity has decreased. Therefore, the timing at which to apply the fresh voltage may be decided from the transmissivity, without keeping track of the time from when the drive voltage to the varifocal component 14 was switched off. In this case, a specific sensor (not shown) is provided to the electronic eyeglasses 8 to sense changes in the transmissivity. The controller 4 identifies a decrease in the transmissivity according to a signal from the specific sensor, and a command signal corresponding to this identification result, that is, a command to switch the voltage on or off to the varifocal component 14, is outputted to the circuit component 18.

INDUSTRIAL APPLICABILITY

The present invention is useful in electronic eyeglasses with which the refractive index can be varied.

REFERENCE SIGNS LIST 2 varifocal lens
4 controller
6 semi-finished blank for varifocal lens
8 electronic eyeglasses
10 eyeglass frame
12 sensor component
14 varifocal component
16 power supply
18 circuit component
20 lower substrate (first substrate)
22 upper substrate (second substrate)
24 Fresnel lens
26 first transparent conductive film
28 first orientation film
30 liquid crystal material 32 second orientation film
34 second transparent conductive film
36 sealing agent

What is claimed:

1. A control device that controls a varifocal lens having a first substrate, a second substrate facing the first substrate, and a varifocal component disposed between the first substrate and the second substrate, the control device comprising:
   an input component that receives signals inputted from a sensor;
   a processor that determines whether a specific switching signal is inputted, wherein the specific switching signal is a signal which indicates that a state of the varifocal lens is to be switched to a high refractive index state, and, when it is determined that the specific signal indicating that a state of the varifocal lens is to be switched to a high refractive index state is received, outputs command signals to switch a state of the varifocal lens to a no-voltage application state, the command signals being signals to initially stop applying voltage to the varifocal component, to then apply voltage to the varifocal component for a specific length of time, and to then finally stop applying voltage to the varifocal component.

2. The control device according to claim 1,
   wherein the varifocal component includes a liquid crystal material, and
   after the control device initially stops voltage to the varifocal component, the control device applies voltage to the varifocal component for the specific length of time while at least part of the liquid crystal material is in a focal conic state.

3. The control device according to claim 2,
   wherein the liquid crystal material is a cholesteric liquid crystal material.

4. The control device according to claim 3,
   wherein the liquid crystal material is subjected to horizontal orientation by an orientation film formed on the first substrate and the second substrate that sandwich the liquid crystal material.

5. The control device according to claim 1,
   wherein after the control device initially stops voltage to the varifocal component, the control device applies voltage to the varifocal component for the specific length of time prior to when the transmissivity of the varifocal component is at its lowest.

6. The control device according to claim 1,
   wherein the control device applies voltage to the varifocal component for the specific length of time after 20 to 600 milliseconds have elapsed since the control device initially stops applying voltage to the varifocal component.

7. The control device according to claim 6,
   wherein the control device applies voltage to the varifocal component for the specific length of time after 50 to 300 milliseconds have elapsed since the control device initially stops applying voltage to the varifocal component.

8. The control device according to claim 1,
   wherein the voltage applied to the varifocal component is a square wave.

9. The control device according to claim 8,
   wherein the voltage applied to the varifocal component after the control device initially stops applying voltage to the varifocal component has a duration equal to one period of the square wave.

10. The control device according to claim 8,
    wherein the voltage applied to the varifocal component after the control device initially stops applying voltage to the varifocal component has a duration equal to one-half the period of the square wave.

11. The control device according to claim 1,
    wherein an amplitude of the voltage applied to the varifocal component is substantially the same as an amplitude of the voltage used to drive the varifocal component.

12. A control method for controlling a varifocal lens having a first substrate, a second substrate facing the first substrate, and a varifocal component disposed between the first substrate and the second substrate, the method comprising:
    receiving signals inputted from a sensor;
    determining whether a specific switching signal is inputted, wherein the specific switching signal is a signal which indicates that a state of the varifocal lens is to be switched to a high refractive index state, and,
    when it is determined that the specific signal indicating that a state of the varifocal lens is to be switched to a high refractive index state is received, outputting command signals to switch a state of the varifocal lens to a no-voltage application state, the command signals being signals to initially stop applying voltage to the varifocal component, to then apply voltage to the varifocal component for a specific length of time, and to then finally stop applying voltage to the varifocal component.

13. Electronic eyeglasses, comprising:
    a varifocal lens having a first substrate, a second substrate facing the first substrate, and a varifocal component disposed between the first substrate and the second substrate;
    an eyeglass frame to which the varifocal lens is attached;
    a sensor provided at the eyeglass frame, the sensor being configured to detect at least one of a user operation and a change in an angle of the eyeglass frame and output a switching signal; and
    a control device that controls a varifocal lens having a first substrate, a second substrate facing the first substrate, and a varifocal component disposed between the first substrate and the second substrate, the control device comprising:
    an input component that receives signals inputted from the sensor;
    a processor that determines whether a specific switching signal is inputted, wherein the specific switching signal is a signal which indicates that a state of the varifocal lens is to be switched to a high refractive index state, and, when it is determined that the specific signal indicating that a state of the varifocal lens is to be switched to a high refractive index state is received, outputs command signals to switch a state of the varifocal lens to a no-voltage application state, the command signals being signals to initially stop applying voltage to the varifocal component, to then apply voltage to the varifocal component for a specific length of time, and to then finally stop applying voltage to the varifocal component.

14. The electronic eyeglasses according to claim 13,
    wherein a Fresnel lens is formed on the first substrate so as to correspond to the varifocal component.

15. A control device that controls a varifocal lens having a first substrate, a second substrate facing the first substrate, and a varifocal component disposed between the first substrate and the second substrate, said control device comprising:
- an input component configured to receive an input of a specific signal;
- a determination component configured to receive the specific signal from the input component and determine whether to switch voltage to the varifocal component on or off according to the specific signal;
- an output component configured to output a command signal to switch the voltage to the varifocal component on or off according to a determination result received from the determination component; and
- a driver configured to receive the command signal from the output component, the driver being configured to, when the command signal is a signal to switch off the voltage to the varifocal component, initially stop applying voltage to the varifocal component, then apply voltage to the varifocal component for a specific length of time, and finally stop applying voltage to the varifocal component.

* * * * *